J. REDDING.
STORAGE BATTERY ELEMENT AND METHOD OF MAKING THE SAME.
APPLICATION FILED JULY 10, 1914.
1,144,311. Patented June 22, 1915.
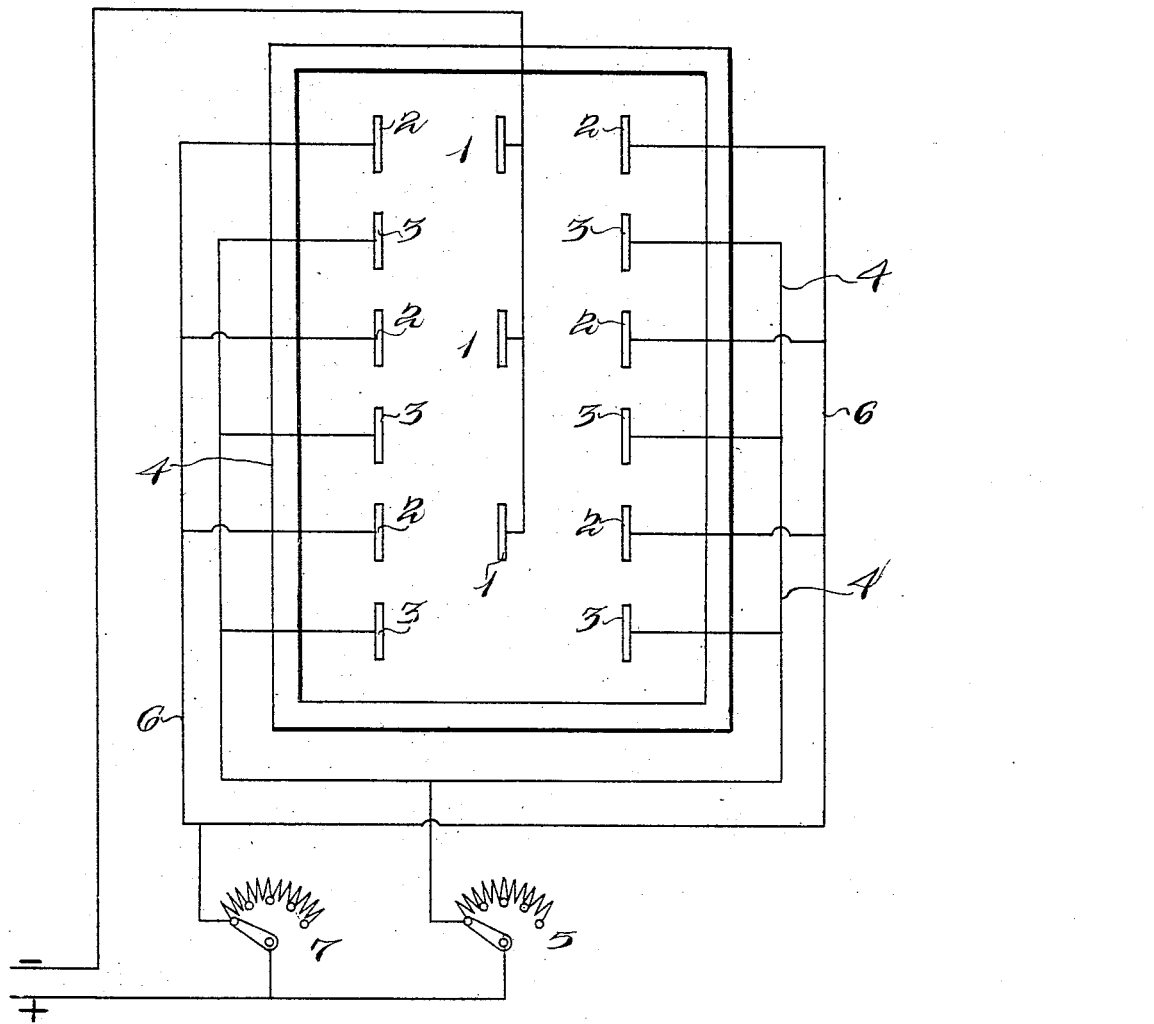

UNITED STATES PATENT OFFICE.

JEROME REDDING, OF MALDEN, MASSACHUSETTS, ASSIGNOR OF ONE-HALF TO ELIAB PARKER, OF BOSTON, MASSACHUSETTS.

STORAGE-BATTERY ELEMENT AND METHOD OF MAKING THE SAME.

1,144,311.  Specification of Letters Patent.  Patented June 22, 1915.

Application filed July 10, 1914. Serial No. 850,091.

*To all whom it may concern:*

Be it known that I, JEROME REDDING, a citizen of the United States, and a resident of Malden, in the county of Middlesex and State of Massachusetts, have invented certain new and useful Improvements in Storage-Battery Elements and Methods of Making the Same, of which the following is a specification.

This invention has relation to electrodes or elements for storage batteries, and has for its object to provide an electrode of maximum porosity, large capacity and great durability, in which the active material is in perfect molecular and electrical connection with the supporting plate or grid, is free from lead hydrate, and is coated with substantially pure lead suboxid. According to my invention, the lead is deposited electrolytically upon the plate in a vast number of minute trees or filaments which are interlaced by pressure as to form a spongy filamentary porous mass, through which when the electrode is in use, there may be a free percolation of the storage battery electrolyte.

The figure on the accompanying drawing illustrates diagrammatically an electrolytic cell for the initial formation of the electrode.

The electrodes 1 consist of perforated lead plates, or if desired light material such as aluminum having a skin coating of lead. The anodes 2 are formed of lead plates, the surface of the anodes and cathodes being preferably equal. The electrolyte consists of a strong alkaline solution, preferably an aqueous solution of caustic soda, which will boil at a temperature of say 225° F. to 235° F. This electrolyte should preferably be made of distilled water and substantially pure caustic soda dissolved therein. In addition to the lead anodes, I also employ supplemental anodes 3, formed of carbon, platinum or the like, which are arranged in a branch or shunt circuit 4 controlled by a rheostat 5. The lead anodes are in a main circuit 6, controlled by a similar rheostat 7. More or less of the current may be diverted through the two sets of anodes as may be desired according to working conditions. An electric current of high density, say 5 amperes per square inch of cathode surface, is employed, although this will vary according to conditions. By any suitable heating means, the electrolyte is heated, preferably to a temperature just short of the boiling point, and the main and branch circuits are closed and controlled until there is a copious evolution of hydrogen at the electrodes 1. At the main anodes 2, oxygen is liberated and reacting with the lead forms lead salts, probably lead sub-oxid, lead monoxid or lead peroxid, which is initially to some extent dissolved in the solution forming sodium plumbate ($Na_2PbO_3$). The water, the caustic soda, the lead oxids, and the sodium plumbate are probably decomposed, and on the cathodes are deposited lead, sodium, lead-sodium alloy, and possibly some sodium oxid. The lead is deposited in the form of relatively long minute trees or filaments, but mixed all through the lead deposit are probably the sodium and lead-sodium alloy, though doubtless more or less of the sodium is hydrated and does not remain as the metal. The action, which I have described, takes place quickly and in a short time a thick compressible spongy mass is formed or deposited on both faces of the cathodes. I regard it as important that the evolution of the oxygen at the lead anodes should not be such as to over oxidize the lead, so as to form an insoluble lead oxid, and hence I employ the supplemental anodes, such as platinum, carbon or the like, in order that a portion of the oxygen may not react with the lead anodes or with the lead salts. Thus I insure to a greater or less extent the formation of the lower forms of lead oxids, such as suboxid or monoxid. Furthermore, by shunting a portion of the current through the carbon anode, I prevent the dissolving of an undue quantity of the lead oxid in the electrolyte and also prevent the formation of insoluble lead oxid. The evolution of the oxygen at the carbon anode may cause the formation of carbon dioxid, and, after some time, sodium carbonate crystals may form in the electrolyte. These, however, if formed, may be removed from time to time and used for various purposes. When the deposit on the cathodes has reached the desired thickness, the latter are removed and placed in a mold having many pins or projections in the top and bottom sides, and are thereby compressed to a proper thickness without so compacting them as to destroy the spongy or filamentary structure, the sodium, caustic soda, etc., with which the pores are filled, all helping to preserve the porosity. The compressed plates are then placed in a stream or bath of distilled water. The plate is washed until substantially all the remaining sodium, and the sodium oxid if there be any, are hydrated and the caustic soda thoroughly removed. The effect of this is to render the mass still more porous and to leave a sponge, consisting of a structure of interlaced filaments of chemically pure lead, molecularly and electrically connected with the base grid or support. While the compressed plates are still wet, they are dried in an inert atmosphere, i. e. containing no oxygen, as in an atmosphere of pure hydrogen, or of illuminating gas if desired. To this end, they are placed in a gently heated oven through which a stream of gas is passed until the plates are completely dry. They are then exposed to dry air, so as to cause the formation of a thin coating of lead sub-oxid to form on the surface thereof, and protect the interior of the sponge until the plates are ready for use.

As a result of the process which I have described, I produce an electrode which is remarkably porous, and in which the entire spongy or porous portion is in perfect electrical and molecular connection with the supporting plate or grid. The compression of the sponge causes the trees or filaments to be interlaced without destroying their molecular connection with the plate or grid, and yet leaves the mass so porous as to permit a free percolation of the electrolyte when the plate is in use in the battery. By the exposure of the plate thus formed to dry air, the surfaces formed by the filamentary structure become coated with suboxid which does not readily sulfate when the electrode is placed in the sulfuric acid electrolyte for use. If the compressed plates, while still wet, are exposed to atmospheric air, lead hydrate is formed, this being accompanied by a heating of the mass. When a plate so hydrated is placed in sulfuric acid electrolyte solution for the first or forming charge, a considerable portion of this mixture is turned into a crystalline white sulfate which is a non-conductor and is with difficulty reduced to lead peroxid. The formation of the crystalline sulfate ultimately causes more or less scaling on the surface, together with a rapid disintegration and a loss while in use. By my process, however, the complete washing away of the sodium hydrate from the plate prevents the formation of sodium carbonate, and, when the moisture or water is dried off in an atmosphere containing no oxygen, I prevent the formation of lead hydrate.

In carrying out my process, care must be taken to so regulate the strength of the current that there is at all times a copious evolution of hydrogen at the cathodes, during the formation of the sponge, as otherwise the deposit may form in a hard non-porous crystalline mass, and from time to time more of the caustic solution, or of water, must be added to the electrolyte to compensate for losses therein. In lieu of carbon, I may employ, for the supplemental anodes, other substances, such as silver or platinum if desired.

A plate, formed in accordance with the present invention, possesses many advantages over a pasted plate, which will be appreciated by one skilled in the art, particularly in that there is no such disintegration as takes place with an amorphous inelastic paste and no such deterioration in capacity as is experienced therewith.

I claim:—

1. A method of producing storage battery plates which consists in electrolytically depositing lead and an alkaline metal upon a support and hydrating and removing the alkaline metal to leave a porous spongy mass of lead.

2. A method of producing storage battery elements which consists in passing a current of electricity through an alkaline solution containing lead salt to a cathode, to cause an electrolytic deposit of the alkaline metal and lead thereon, then removing and washing the cathode, and then drying the cathode in an inert atmosphere containing no free oxygen.

3. A method of producing storage battery elements which consists in passing an electric current through a heated strongly alkaline caustic solution containing lead salt, to a cathode, thereby decomposing said solution and said salt and depositing lead and the alkaline metal on the cathode, washing said cathode to remove any alkaline deposit, and drying said cathode in an inert atmosphere.

4. A method of producing storage battery elements which consists in passing an electric current through a heated strongly alkaline caustic solution containing lead salt to a cathode, thereby decomposing said solution and said salt and depositing lead and the alkaline metal on the cathode, washing said cathode to remove any alkaline deposit, drying said cathode in an inert atmosphere, and then suboxidizing the exposed portions of the said lead deposit on the cathode.

5. The herein described process which consists in passing a current of electricity through an electrolyte from a lead anode to a cathode, to cause the electrolytic deposit of lead upon said cathode, and shunting a portion of said current through an anode of other material than lead to prevent the overoxidation of the lead salt formed in the electrolyte.

6. The herein described process which consists in electrolytically depositing filamentary non-crystalline spongy lead upon a supporting plate, compressing the deposited lead, washing the plate and the deposit, drying said plate in an atmosphere containing no free oxygen, and then oxidizing the surfaces of the deposited lead by exposing the same to dry air.

7. The herein described method of making storage battery elements, which consists in electrolytically decomposing a solution of caustic soda and lead oxid, depositing sodium and lead in a spongy mass upon a plate or grid, hydrating the deposited sodium and washing away the hydrate.

8. The herein described method of making storage battery elements, which consists in passing a current of electricity from a lead anode to a lead cathode through a caustic alkaline electrolyte, depositing lead and sodium on the cathode, subjecting the cathode to a reagent to remove the sodium, and compressing the spongy mass thus formed on the cathode.

9. The herein described method of forming a storage battery element, which consists in electrolytically forming upon a lead surface a spongy deposit containing lead and sodium, compressing said deposit, hydrating and removing the sodium to increase the porosity of the deposit, and then drying the deposited lead in an inert atmosphere.

10. The herein described process which consists in passing a current of electricity of high density from a lead anode to a lead cathode of substantially equal surface area through a strongly caustic-alkaline solution, shunting a portion of said current through a supplemental anode of carbon or the like to prevent over oxidation of the lead salt, then removing the lead cathode with the spongy deposit thereon, and washing the same to leave a pure lead deposit, drying the same in an inert atmosphere, and then oxidizing the same in dry air.

11. A storage battery element, consisting of a support and a porous filamentary spongy mass of pure lead thereon, the exposed surfaces of said sponge being coated with suboxid and free from lead hydrate.

In testimony whereof I have affixed my signature, in presence of two witnesses.

JEROME REDDING.

Witnesses:
MARCUS B. MAY,
P. W. PEZZETTI.